(12) United States Patent
Dow et al.

(10) Patent No.: US 8,322,520 B2
(45) Date of Patent: Dec. 4, 2012

(54) TONGUE-IN-GROOVE BELT HOLD DOWN FOR A DRAPER PLATFORM

(75) Inventors: Chad A Dow, East Moline, IL (US);
Benjamin M. Lovett, Colona, IL (US);
Ryan S. Herlyn, Port Byron, IL (US);
Todd N. Signer, East Moline, IL (US);
Corwin M. Puryk, East Moline, IL (US); Joshua Ryan Pierson, Davenport, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/097,540

(22) Filed: Apr. 29, 2011

(65) Prior Publication Data

US 2012/0043185 A1    Feb. 23, 2012

Related U.S. Application Data

(60) Provisional application No. 61/374,605, filed on Aug. 17, 2010.

(51) Int. Cl.
*B65G 15/60* (2006.01)

(52) U.S. Cl. .............................. 198/837; 56/181; 56/208

(58) Field of Classification Search .................. 198/837, 198/840, 841; 56/15.8, 181, 208
See application file for complete search history.

(56) References Cited

U.S. PATENT DOCUMENTS

| | | | | |
|---|---|---|---|---|
| 7,549,280 | B2 * | 6/2009 | Lovett et al. | 56/208 |
| 7,802,417 | B2 * | 9/2010 | Sauerwein et al. | 56/181 |
| 7,805,921 | B2 * | 10/2010 | Coers et al. | 56/364 |
| 7,886,512 | B2 * | 2/2011 | Lohrentz et al. | 56/181 |
| 7,913,481 | B2 * | 3/2011 | Sauerwein | 56/208 |
| 7,926,248 | B2 * | 4/2011 | Schmidt et al. | 56/181 |
| 2009/0266044 | A1 * | 10/2009 | Coers et al. | 56/208 |

* cited by examiner

*Primary Examiner* — James R Bidwell

(57) ABSTRACT

A conveyor belt hold down for a draper platform comprises a planar portion having a front edge, a rear edge, a left edge, and a right edge, wherein one of the left and the right edges defines a first slot or groove structure, and the other of the left and the right edges defines a first tongue structure, wherein the first tongue structure is configured to be engaged in a second slot or groove structure of a similar hold down disposed immediately adjacent to the first tongue structure, and wherein the first slot or groove structure is configured to receive a second tongue structure of a similar hold down disposed immediately adjacent to the first slot or groove structure.

9 Claims, 6 Drawing Sheets

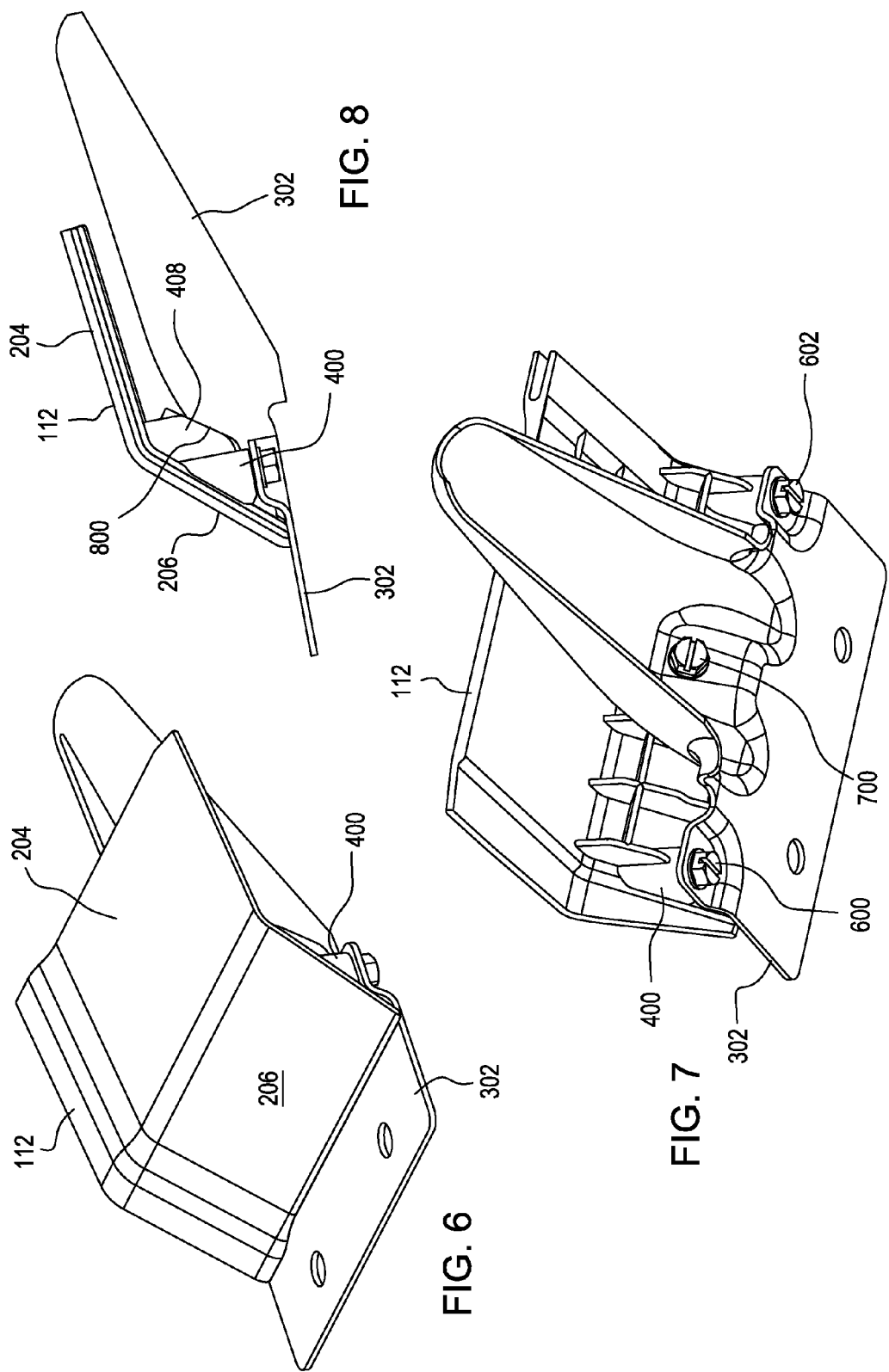

TONGUE-IN-GROOVE BELT HOLD DOWN FOR A DRAPER PLATFORM

RELATED APPLICATIONS

This invention claims priority from U.S. Provisional Patent Application No. 61/374,605, filed 2010 Aug. 17 which is incorporated herein by reference for all that it teaches.

FIELD OF THE INVENTION

The invention relates generally to draper platforms for agricultural combines. More particularly it relates to belt hold downs for draper platforms. Even more particularly, it relates to the inter-engagement of adjacent belt hold downs.

BACKGROUND OF THE INVENTION

Draper platforms are elongate laterally extending harvesting devices configured to be mounted on the front of agricultural combines. Draper platform's extend generally perpendicular to the direction of travel and are configured to sever crop plants from the ground, carry them inwardly on flat conveyor belts toward a center section of the draper platform, and then convey them rearward through an aperture in the conveyor platform into a feederhouse of an agricultural combine, and thence into the agricultural combine itself.

In one arrangement, the forward edge of the conveyor belts that convey the crop inwardly toward a center section of the draper platform are covered by a stationary hold down that is affixed to a leading edge of the draper platform right behind a reciprocating knife. These hold downs serve dual functions. First, they provide a surface over which cut crop material is easily dragged by the traditional reel mounted on the draper platform. Second, they cover the leading edge of the conveyor belt to hold the belt down and ensure that cut crop material does not become wedged underneath the conveyor belt.

Newer draper platform designs permit the reciprocating knife and the leading edge of the draper platform to move up and down in order to better follow the contours of the land. As a result, the hold downs must be permitted to flex with respect to each other sliding into closer engagement in withdrawing into a more distant engagement as the leading edge of the draper platform is dragged over the surface of the ground.

This flexibility of engagement means that the hold downs must be made in short sections, close together along substantially the entire width of the draper platform immediately behind the reciprocating knife. A draper platform that is 10-15 meters in width may have 30-40 of these individual hold downs in a row on each side of the draper platform across substantially the entire width of the draper platform, with each hold down being interengaged with its two adjacent hold downs.

While this arrangement permits the draper platform to flex up and down along its leading edge, it also provides gaps into which soil, grain, or crop plants may become jammed. Once one of the joints between the adjacent hold downs becomes filled with unwanted matter, the unwanted matter spreads the adjacent hold downs farther and farther apart until the lower surfaces of the hold downs rubs against the conveyor belt traveling immediately underneath. This causes wear of the conveyor belt, and wear of the hold downs as well. If the hold downs are made of plastic, they can be damaged relatively easily.

What is needed, therefore, is a new conveyor belt hold down that resists the insertion of unwanted matter in between adjacent hold downs. It is an object of this invention to provide such a hold down.

SUMMARY OF THE INVENTION

A conveyor belt hold down for a draper platform is a generally planar structure with first and second opposing side edges configured with engagement structures, and a rear edge disposed to extend over the conveyor belt close enough to hold the conveyor belt down, and a forward edge disposed to be fixed adjacent to an elongate reciprocating knife, where the first opposing side edge defines a first elongate planar tongue, and wherein the second opposing side edge defines a first elongate planar groove, the first elongate planar tongue being configured to be received in a second elongate planar groove of an adjacent upstream conveyor belt hold down, and where in the first elongate planar groove is configured to receive a second elongate planar tongue of a downstream conveyor belt hold down.

The conveyor belt hold down, the upstream conveyor belt hold down and the downstream conveyor belt hold down are preferably identically constructed such that each of them has a similar elongate planar tongue, and each of them has a similar elongate planar groove.

Bosses may be provided on a lower surface of the conveyor belt hold downs to provide attachment points for the hold down. The bosses are preferably cylindrical, and have a downwardly facing open circular aperture configured to receive a cylindrical threaded fastener.

The generally planar structure of the conveyor belt hold down is preferably in the form of two planar sheets or portions joining each other at a longitudinal bend extending substantially the entire width of the hold down in the transverse direction. The two planar sheets include an upper planar sheet and lower planar sheet that are joined together at an included angle of approximately 150°, and preferably between 110 and 170 degrees, such that the upper planar sheet is preferably disposed generally flat and parallel to the conveyor belt, and is preferably spaced a constant distance of approximately three to ten mm from the upper surface of the conveyor belt.

A forward edge of the hold down forms the leading edge of the lower planar sheet. This edge is generally straight, and is configured to abut an elongate steel member immediately behind a reciprocating knife that is disposed at the leading edge of the draper platform. A rear edge of the hold down forms the trailing edge of the upper planar sheet. This rear edge is disposed immediately adjacent to and on top of the conveyor belt. Two opposed side edges extend from opposite sides of the upper planar sheet and the lower planar sheet. The opposed side edges include structures that interengage each other to minimize the entry of cut crop material and soil between adjacent hold downs.

In a prior art arrangement, these opposed side edges were overlapped in the manner of roofing shingles, having one edge slightly higher than the other edge. This permitted them to be overlapped yet fixed securely to the leading edge of the draper platform.

In the present application, a slot or groove is formed on the downstream edge of the hold down and a tongue is formed on the upstream edge of the hold down. This arrangement permits a row of hold downs to be disposed adjacent to each other extending across substantially the entire width of the draper platform with an upstream edge in the form of a tongue received in the downstream edge of the upstream hold down which is in the form of a groove or slot.

In one embodiment, a first plurality of identical hold downs can be fixed to the left side of the draper platform. A second plurality of identical (but mirror image) hold downs can be fixed to the right side of the draper platform. The first plurality of hold downs are disposed in front of the left side draper belt, which moves from the left to the right.

The left (upstream) edge of the opposed side edges of the first plurality of hold downs defines the tongue structure. This tongue structure is configured to be received in a slot or groove structure disposed at and defined by the downstream edge of an adjacent (upstream) hold down.

The right (downstream) edge of the opposed side edges of the first plurality of hold downs defines the slot or groove structure. This slot or groove structure is configured to receive a tongue structure defined by the upstream edge of an adjacent (downstream) hold down.

The second plurality of hold downs is identical to the first plurality of hold downs but is a mirror image of the first plurality such that the left and right sides of the second plurality of hold downs are reversed.

A conveyor belt hold down for a draper platform may also comprise a planar portion having a front edge, a rear edge, a left edge, and a right edge, wherein one of the left edge and the right edge defines a first slot or groove structure, and another of the left edge and the right edge defines a first tongue structure, wherein the first tongue structure is configured to be engaged in a second slot or groove structure of a substantially similar hold down disposed immediately adjacent to the first tongue structure, and wherein the first slot or groove structure is configured to receive a second tongue structure of a substantially similar hold down disposed immediately adjacent to the first slot or groove structure.

The planar portion may also comprise an upper planar portion and a lower planar portion disposed at an angle with respect to each other, and further wherein the lower planar portion has a first plurality of bosses with holes that are formed integral with the lower planar portion and extend downward from an inside lower surface of the lower planar portion.

The first plurality of bosses may have holes defined therein that are generally parallel to each other and perpendicular to an outer surface of upper planar portion.

The conveyor belt hold down may further comprise a plurality of ribs extending downward from the inside lower surface of the lower planar portion, said plurality of ribs being formed integral with the inside lower surface of the lower planar portion and formed integral with the first plurality of bosses.

The conveyor belt hold down may further comprise a second plurality of bosses that have holes that are parallel to each other and that extend generally perpendicular to the inside surface of the lower planar portion.

The upper planar portion and lower planar portion may be disposed at an angle of between 110° and 170° with respect to each other.

The slot or groove structure may include an upper flange and a lower flange extending outward from the upper planar portion.

A lower surface of the lower flange may be coplanar with a lower surface of the upper planar portion.

The planar portion and the tongue structure and slot or groove structure may be formed integral with each other of injection molded plastic

BRIEF DESCRIPTION OF THE DRAWINGS

FIGS. 6 and 7 are a perspective views of the conveyor belt support and the conveyor belt hold down.

FIG. 8 is a left side view of the conveyor belt support and the conveyor belt hold down.

DETAILED DESCRIPTION OF THE PREFERRED EMBODIMENT

Figure 1:
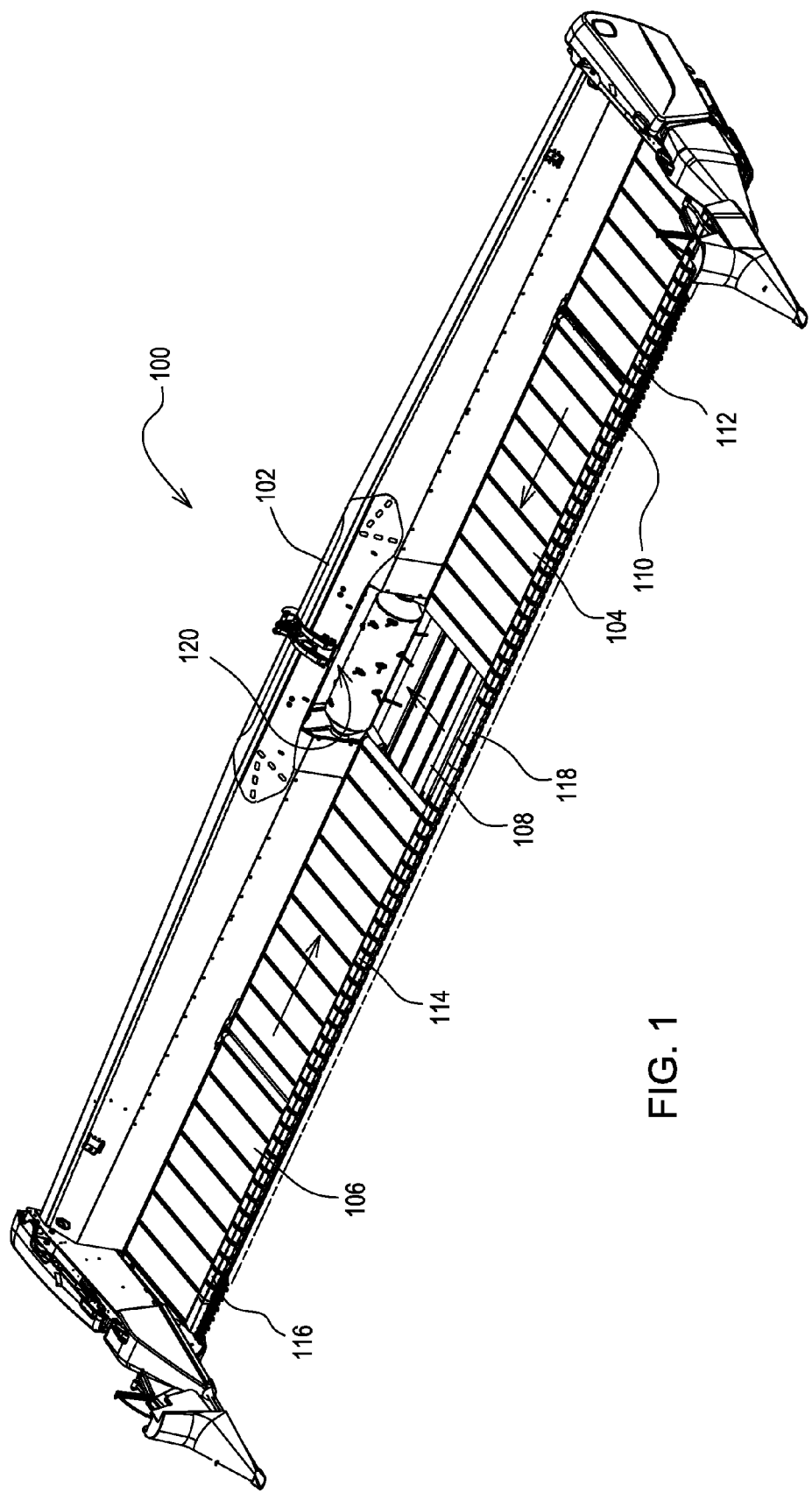
FIG. 1 is a perspective view of a draper platform for an agricultural combine with the reel removed illustrating a linear array of conveyor belt hold downs in accordance with the present invention that are disposed along the leading edge of the draper platform.

FIG. 1 illustrates a draper platform 100 having a frame 102 upon which are mounted a left side conveyor 104 having an endless belt, right side conveyor 106 having an endless belt, an a center conveyor 108 having an endless belt. These three conveyor belts are disposed immediately behind a reciprocating knife 110 which extends substantially the entire width of the draper platform 100. The leading edges of the endless belt of left side conveyor 104 and the endless belt of right side conveyor 106 are held underneath a row of conveyor belt hold downs 112, and 114, respectively. The conveyor belt hold downs may also called "belt guides", and alternatively "crop ramps", for their function in lifting the crop from the reciprocating knife upward and across onto the conveyor belts.

The thirty-three conveyor belt hold downs 112 located on the left side of the draper platform 100 are identically configured. The thirty-three conveyor belt hold downs 114 located on the right side of the draper platform 100 are also identically configured. In addition, short elongate hold downs 116 (only the right side is shown) are disposed on the left and right ends of the draper platform. In the discussion below, the construction and operation of the conveyor belt hold downs 114 on the right side of the draper platform are identical to that of the conveyor belt hold downs 112 on the left side of the platform, but are arranged in mirror image form. Further, a single center conveyor crop ramp 118 is disposed in front of the center conveyor to guide crop upward and onto the center conveyor belt.

The conveyor belt hold downs 112, 114 are preferably made unitary as a one piece simultaneously formed structure, and not as a collection of individual parts that are later welded or otherwise fastened together. More preferably they are made in a single injection molding process entirely of injection molded plastic.

The left side conveyor 104 is an endless belt conveyor that conveys crops laterally, toward the center of the draper platform as indicated by the arrow superimposed upon the left side conveyor. The right side conveyor 106 is an endless belt conveyor that conveys crops laterally, toward the center of the draper platform as indicated by the arrow superimposed on the right side conveyor. Center conveyor 108 is an endless belt conveyor that moves rearwardly, in the direction of the arrow superimposed on the center conveyor. Together, the three conveyors move crop inwardly and then rearwardly through an aperture 120 in the frame 102 of the draper platform 100. The crop is transmitted into a feederhouse (not shown) that extends forward from the front of the agricultural combine (not shown), which further processes the cut crop material.

Reciprocating knife 110 has a plurality of blades and guards that interengage to sever plant stalks near the surface of the ground. The plants fall backwards on to the left and right side conveyor belts and are carried as thick mats towards the center conveyor.

Figure 2:
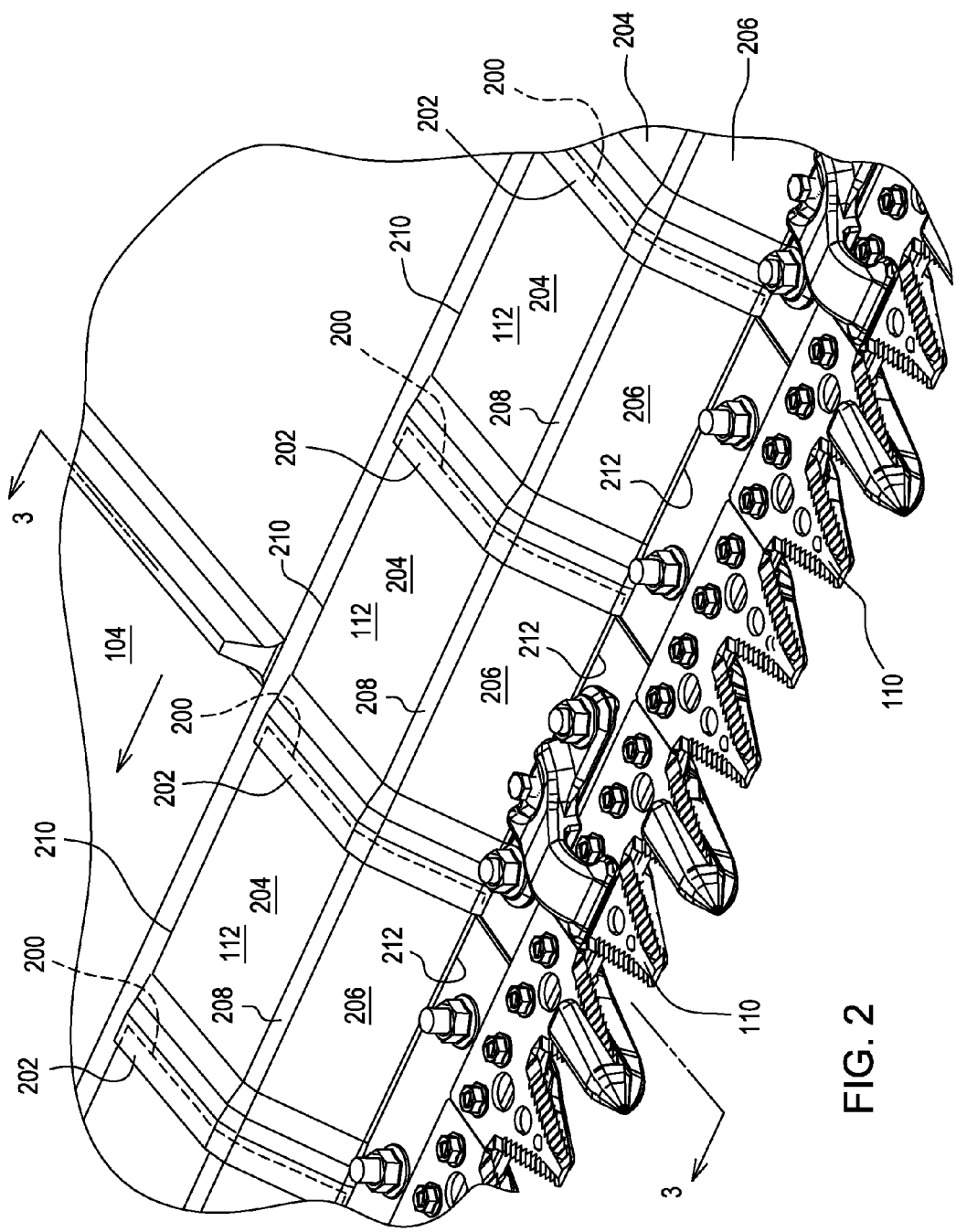
FIG. 2 is a detailed perspective view of the draper platform of FIG. 1, showing portions of the conveyor belt, conveyor belt hold downs, and reciprocating knife on the left side of the draper platform.

In FIG. 2, the endless belt of left side conveyor 104 is disposed immediately underneath and extends behind a row of conveyor belt hold downs 112. Conveyor belt hold downs 112 interengage with each other at their opposing lateral sides.

Each conveyor belt hold down 112 has an inner lateral (or side) edge in the form of a slot or groove structure 202 defining the hold down's downstream side. "Inner" in this context means the lateral edge of the conveyor belt hold down 112 that is closer to the center of the draper platform. The inner edge of the conveyor belt hold downs 112 on the left side of the draper platform is the right edge when looking in the forward direction of travel. The inner edge of the conveyor belt hold downs 112 on the right side of the draper platform is the left edge.

Each conveyor belt hold down 112 also has an outer lateral (or side) edge in the form of a tongue structure 200 defining its upstream side. "Outer" in this context means the lateral edge of the conveyor belt hold down 112 that is farther from the center of the draper platform. The outer edge of the conveyor belt hold downs 112 on the left side of the draper platform is the left edge when looking in the forward direction of travel. The outer edge of the conveyor belt hold downs 112 on the right side of the draper platform is the right edge.

Each slot or groove structure 202 of a first conveyor belt hold down is configured to receive and support a corresponding tongue structure 200 extending upstream from an opposing upstream edge of a second conveyor belt hold down 112 that is disposed immediately downstream from the first conveyor belt hold down 112.

All of the conveyor belt hold downs 112 on each side are preferably made identical to each other such that any one can function as a part-for-part replacement for any other one the same side of the draper platform.

The hold downs for the right side conveyor belt are arranged in mirror image fashion to those of the endless belt of left side conveyor 104 shown in FIG. 2. Such that the tongue structures are located on the right side Conveyor belt hold downs 112 are generally planar having a flat upper planar portion 204 and a flat lower planar portion 206 that meet at a junction line (or bend) 208. The junction line extends substantially parallel to rear edge 210 and to front edge 212. The included angle between these two planar portions is approximately 150°, and more preferably between 110° and 170°. The junction line 208 for each of the conveyor belt hold downs 112 extends generally horizontally. Each end of the junction line 208 abuts the junction line 208 for the adjacent conveyor belt hold downs 112. The upper planar portion 204 of each conveyor belt hold down 112 is generally coplanar with the upper planar portions 204 of the adjacent conveyor belt hold downs 112. Similarly, the flat lower planar portion 206 of each conveyor belt hold down 112 is generally coplanar with the flat lower planar portions 206 of the adjacent conveyor belt hold downs 112.

Each of the conveyor belt hold downs 112 has a rear edge 210 that is generally collinear with the rear edges 210 of adjacent conveyor belt hold downs 112. These rear edges 210 are disposed on top of the endless belt of left side conveyor 104 as better shown in FIG. 3, discussed below. Each of the conveyor belt hold downs 112 has a front edge 212 that abuts an upper surface of an elongate bar 310 (FIG. 3) upon which reciprocating knife 110 is mounted for reciprocating movement. By this arrangement, cut crop material severed from the ground by reciprocating knife 110 falls backward up on conveyor belt hold down 112, and can only be carried upward over flat lower planar portion 206, across upper planar portion 204, and on the endless belt of left side conveyor 104. Due to the tongue-and-groove interengagement of adjacent side edges of conveyor belt hold downs 112, crop leakage between the adjacent conveyor belt hold downs is virtually impossible. The arrangement of conveyor belt hold downs therefore serves not only to hold the leading edge of the endless belt of left side conveyor 104 down, it also serves as a crop ramp to carry all crop material from the reciprocating knife 110 to the endless belt of left side conveyor 104.

Figure 3:
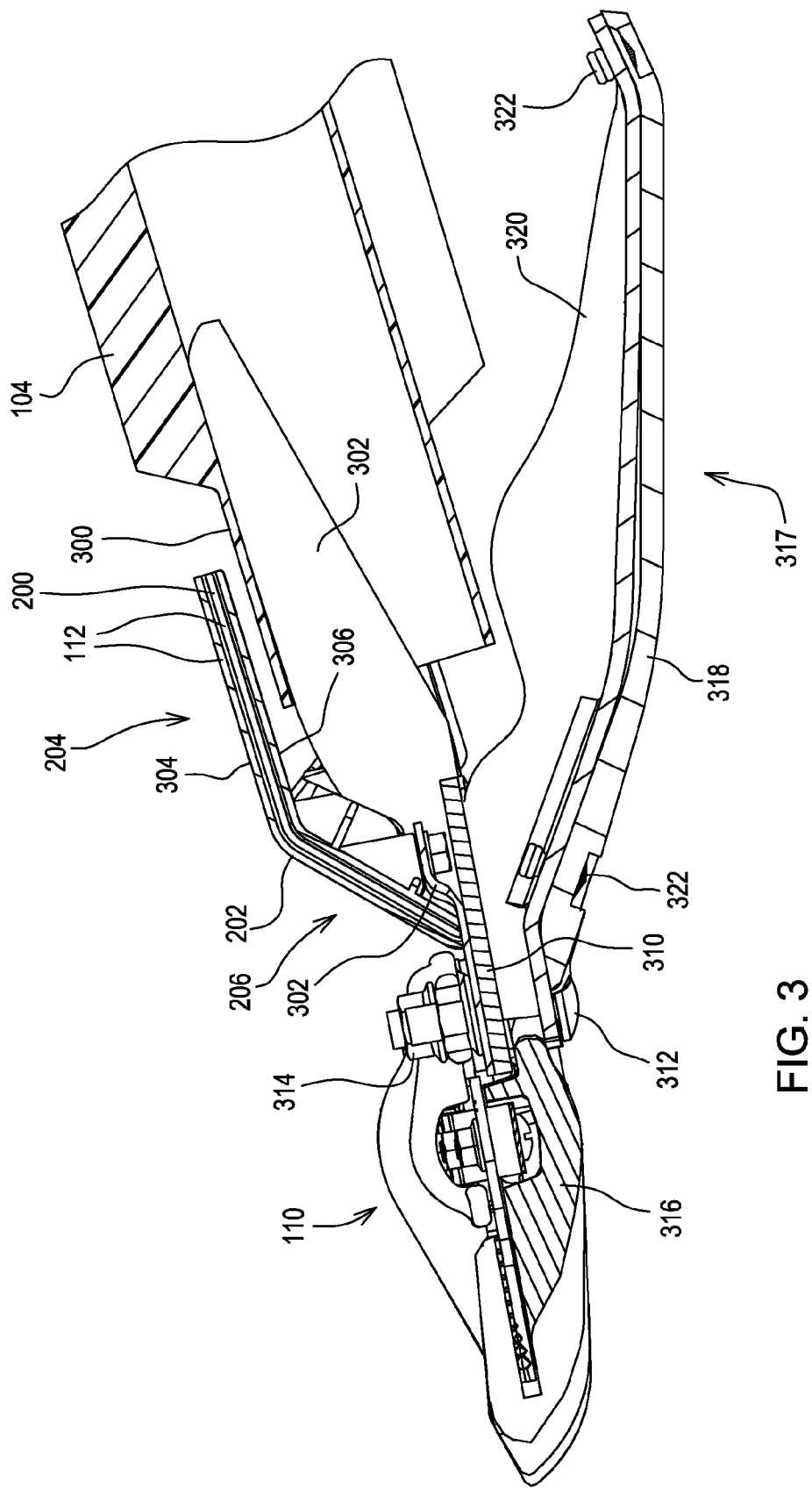
FIG. 3 is a cross-sectional view of the draper platform of the foregoing figures taken at section line 3-3 in FIG. 2.

FIG. 3 is a cross-sectional view through the leading edge of draper platform 100. The endless belt of left side conveyor 104 includes an upper run 300 that is supported on a conveyor belt support 302 and is covered by conveyor belt hold down 112. Slot or groove structure 202 is defined by an upper flange 304 and a lower flange 306 that extend substantially the entire fore-and-aft extent of conveyor belt hold down 112. These two flanges 304, 306 are spaced apart and create a gap therebetween which is sufficient to receive tongue structure 200 from the downstream conveyor belt hold down 112. This interengagement of tongue structure 200 and slot or groove structure 202 therefore extends from the front edge 212 of conveyor belt hold down 112 to the rear edge 210.

Conveyor belt hold down 112 is fixed to conveyor belt support 302, which in turn is fixed to elongate flexible bar 310 which extends substantially the entire width of draper platform 100 immediately behind the reciprocating knife 110. Reciprocating knife 110 is also fixed to elongate flexible bar 310 with threaded fasteners 312. Threaded fasteners 312 are secured with nuts 314 fixing the reciprocating knife mounts 316 and conveyor belt supports 302 to elongate flexible bar 310.

When the draper platform 100 travels over rough terrain, the ground presses upward against skid shoe 317. Skid shoe 317 is comprised of a plastic bottom sheet 318 that is fixed to a skid shoe body 320. The skid shoe body 320 is in turn fastened to elongate flexible bar 310 by fastener 312. Plastic bottom sheet 318 is fixed to skid shoe body 320 by fasteners 322.

Figure 4:
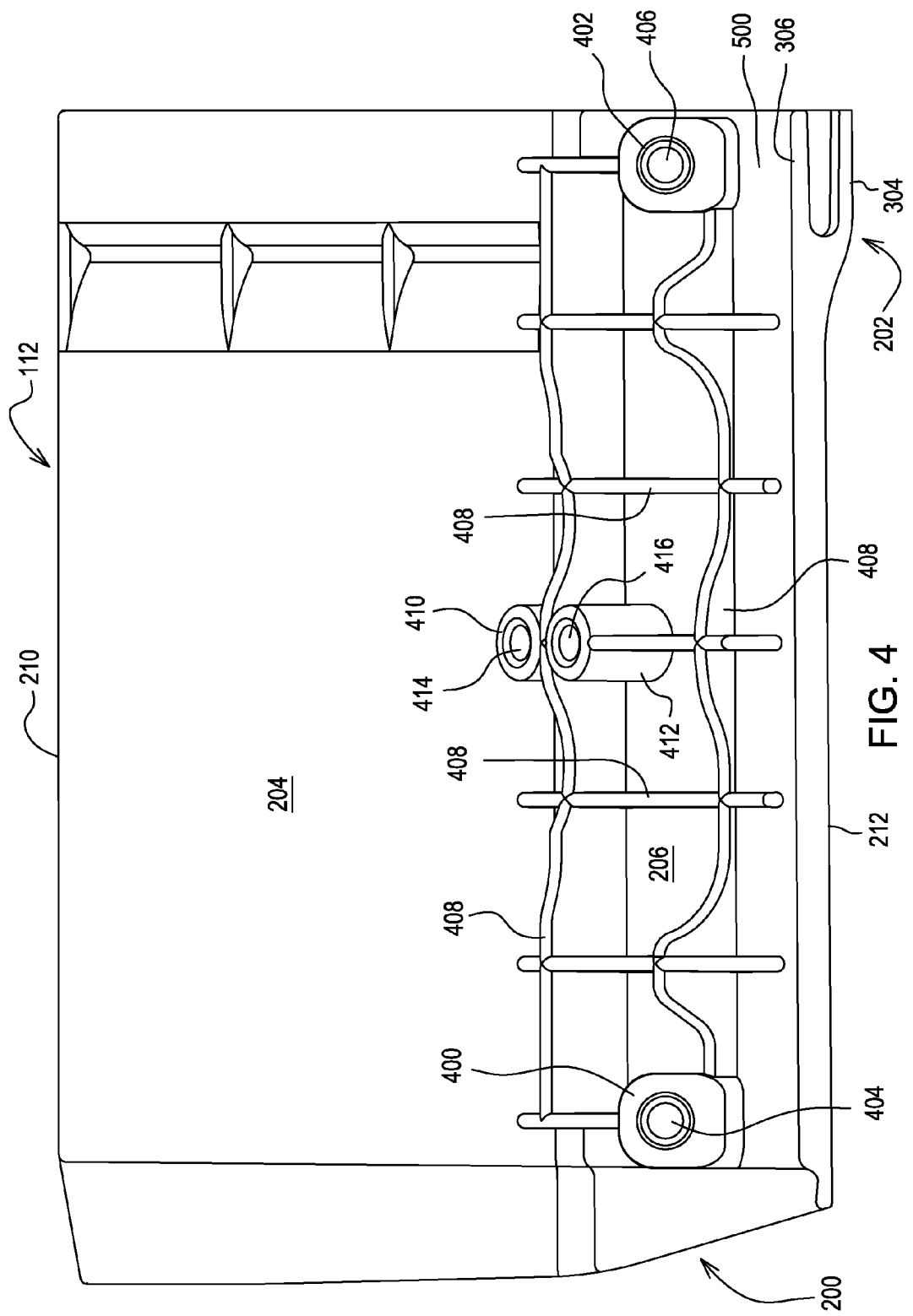
FIG. 4 is a bottom view of a draper platform left side conveyor belt hold down of the foregoing figures.
Figure 5:
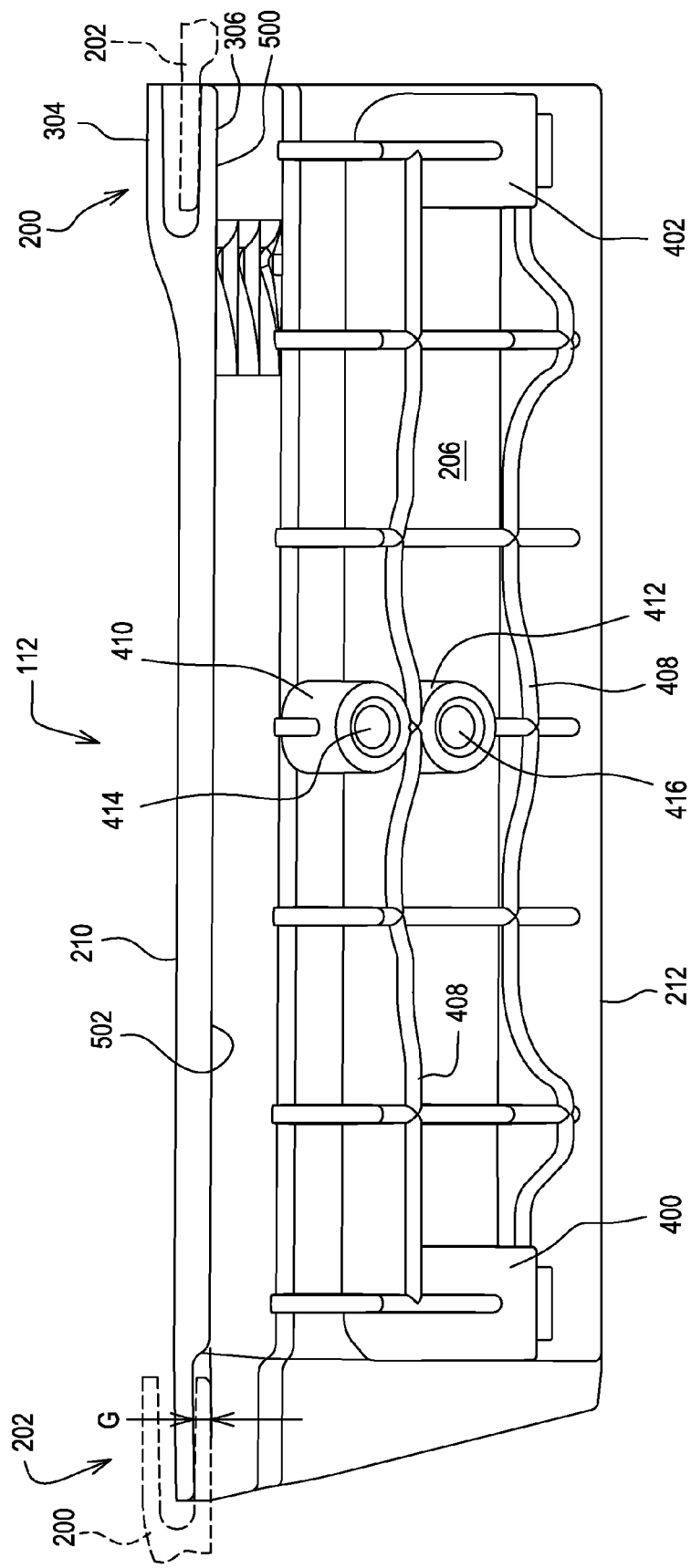
FIG. 5 is a rear view of a draper platform left side conveyor belt hold down of the foregoing figures.

Referring now to FIGS. 4 and 5, several structures are provided on the underside of conveyor belt hold downs 112 that serve as mounting points for conveyor belt hold downs 112 to conveyor belt support 302. In particular, two bosses 400, 402 are formed integrally with the inside surface of conveyor belt hold down 112. They have holes 404, 406, respectively, which are dimensioned to receive the shank of a threaded fastener extending upward from conveyor belt support 302. Conveyor belt hold downs 112 also comprise an array of ribs 408 that are generally rectangular and extend generally at right angles and downward from the inner surface of flat lower planar portion 206. The outer ends of these ribs provide mounting surfaces that are abutted against the upper surface of conveyor belt support 302 when the fasteners that secure conveyor belt hold downs 112 against conveyor belt support 302 are tightened. Boss 402 extends downward from flange 306, which forms one half of the slot or groove structure 202. By providing a boss 402 directly underneath and extending downward from slot or groove structure 202, the flexure of the slot in groove structure 202 can be reduced and therefore the gap between flanges 304, 306 more effectively controlled and the entry of foreign matter into the slot or groove defined there between can be significantly reduced or eliminated. Two additional bosses 410, 412 are disposed at a lateral midpoint of flat lower planar portion 206, and likewise extend downward from the inner surface of flat lower planar portion 206. Bosses 410, 412 extend inwardly at right angles from flat lower planar portion 206. Each of bosses 410, 412 have an aperture 414, 416 that is configured to receive the shank of a threaded fastener extending through an aperture in conveyor belt support 302.

In FIG. 5, the inside surface contours of conveyor belt hold down 112 show the flush lower surface arrangement in the interengaging region of tongue structure 200 and slot or groove structure 202. In particular, flange 306 has a lower belt facing surface 500 that is coplanar with belt facing surface 502 at rear edge 210 of conveyor belt hold down 112. Thus, when each conveyor belt hold down 112 is engaged with adjacent conveyor belt hold downs 112 on either side, they form together a continuous coplanar surface facing the belt. This arrangement avoids protrusions on the inside belt facing surface of the conveyor belt hold downs 112 that would otherwise drag against the forward edge of the endless belt of left side conveyor 104. This arrangement also distributes the belt pressure evenly over substantially the entire inner belt facing surface portion of conveyor belt hold down 112 and thereby evenly distributes the heat generated by the belt rubbing against conveyor belt hold downs 112 when the draper platform 100 flexes up and down. In order to accommodate this coplanar lower belt facing surface 500, the tongue structure 200 must be correspondingly displaced upward and away from a the belt surface thereby providing a clearance gap G on the underside surface of tongue structure 200 that will receive lower flange 306, as best shown in FIG. 5.

Flange 304 has an inner and downwardly facing surface that is opposed to an inner and upwardly facing surface of flange 306. These two surfaces are generally parallel to each other and extend in a horizontal direction to define a slot or groove there between having a horizontally facing opening in a horizontal depth of between two and four times the gap between the two surfaces. Flanges 304, 306 terminate at the same vertical position such that neither flange 304 nor flange 306 extends farther than the other flange.

FIGS. 6, 7, and 8 illustrate different perspective views of the conveyor belt hold down 112 as it appears fixed to conveyor belt support 302 immediately prior to being fastened to elongate flexible bar 310. In the arrangement shown in FIGS. 6, 7, and 8, the conveyor belt hold down 112 is fixed to the conveyor belt support 302 at three places: to bosses 400 and 402 with threaded fasteners 600, 602 and to boss 412, with threaded fastener 700.

Fasteners 600, 602 extend upward through apertures in conveyor belt support 302 and thence into holes 404, 406 of conveyor belt hold down 112. Holes 404, 406 in bosses 400, 402 have axes that are parallel and almost perpendicular to flat upper planar portion 204. This arrangement provides significant leverage to prevent the upward flexure of flat upper planar portion 204 when the endless belt of left side conveyor 104 (not shown) lifts upward and pushes against conveyor belt hold down the 112. As best shown in FIG. 8, at their outer ends, ribs 408 abut a forward facing surface 800 of conveyor belt support 302.

A third, threaded fastener 700 (see FIG. 7) extends through an aperture in the forward facing surface 800 and into boss 412. This arrangement provides three attachment points for conveyor belt hold down 112 against conveyor belt support 302.

The invention claimed is:

1. A conveyor belt hold down for a draper platform, the hold down comprising: a planar portion having a front edge, a rear edge, a left edge, and a right edge, wherein one of the left edge and the right edge defines a first slot or groove structure, and another of the left edge and the right edge defines a first tongue structure, wherein the first tongue structure is configured to be engaged in a second slot or groove structure of a substantially similar hold down disposed immediately adjacent to the first tongue structure, and wherein the first slot or groove structure is configured to receive a second tongue structure of a substantially similar hold down disposed immediately adjacent to the first slot or groove structure.

2. The conveyor belt hold down of claim 1, wherein the planar portion comprises an upper planar portion and a lower planar portion disposed at an angle with respect to each other, and further wherein the lower planar portion has a first plurality of bosses with holes that are formed integral with the lower planar portion and extend downward from an inside lower surface of the lower planar portion.

3. The conveyor belt hold down of claim 2, wherein the first plurality of bosses have holes defined therein that are generally parallel and perpendicular to an outer surface of upper planar portion.

4. The conveyor belt hold down of claim 2, further comprising a plurality of ribs extending downward from the inside lower surface of the lower planar portion, said plurality of ribs being formed integral with the inside lower surface of the lower planar portion and with the first plurality of bosses.

5. The conveyor belt hold down of claim 2, further comprising a second plurality of bosses that have holes that are parallel to each other and that extend generally perpendicular to the inside surface of the lower planar portion.

6. The conveyor belt hold down of claim 2, wherein the upper planar portion and lower planar portion are disposed at an angle of between 110° and 170° with respect to each other.

7. The conveyor belt hold down of claim 2, wherein the slot or groove structure includes an upper flange and a lower flange extending outward from the upper planar portion.

8. The conveyor belt hold down of claim 7, wherein a lower surface of the lower flange is coplanar with a lower surface of the upper planar portion.

9. The conveyor belt hold down of claim 1, wherein the planar portion and the tongue structure and slot or groove structure are formed integral with each other of injection molded plastic.

\* \* \* \* \*